Nov. 19, 1968 K. I. L. ASPMAN ET AL 3,411,950
COLD WATER SWELLING CARBOHYDRATES
Filed Dec. 2, 1966
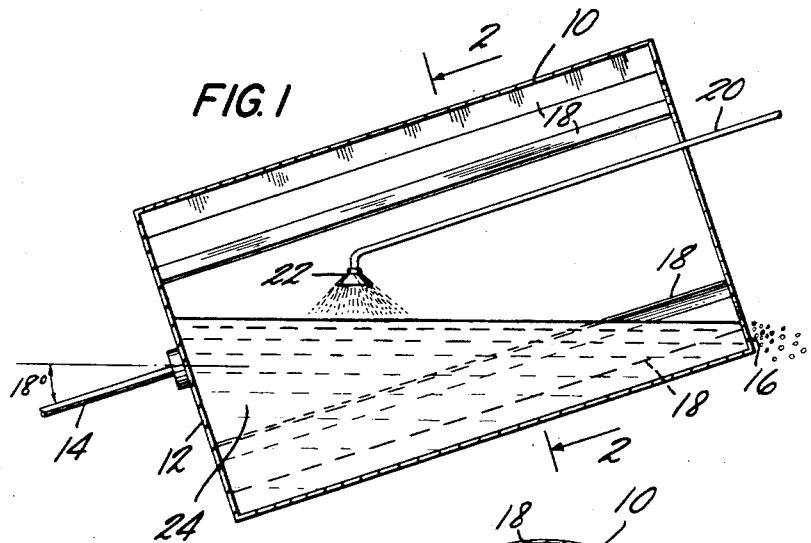
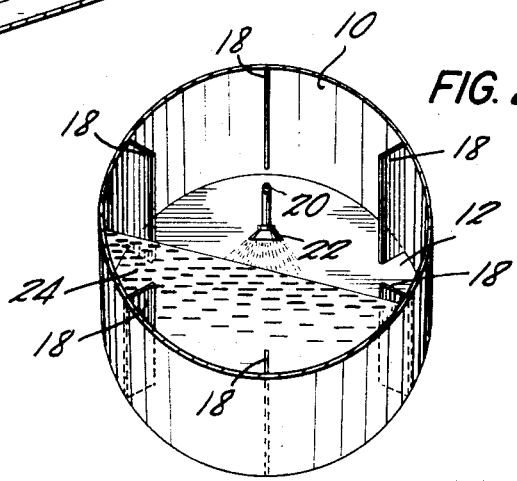
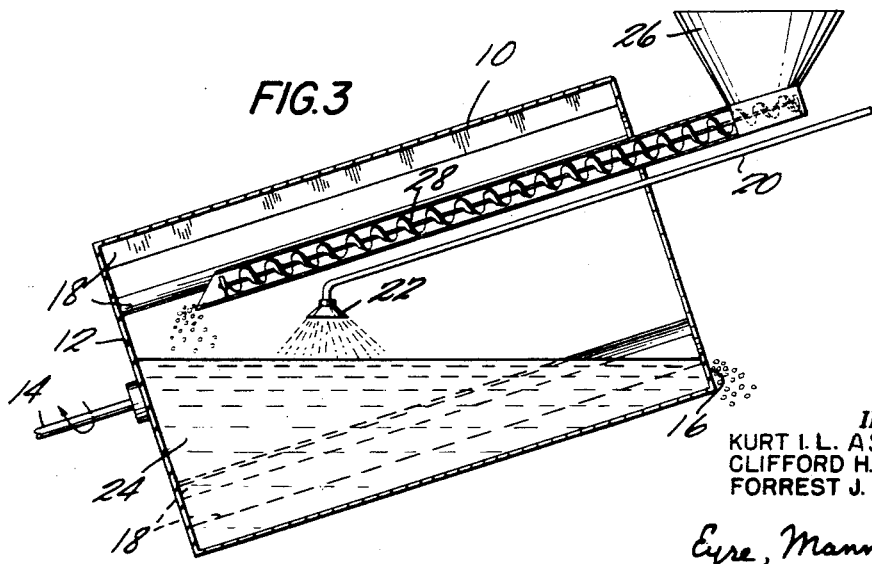
INVENTORS
KURT I. L. ASPMAN
CLIFFORD H. HULLINGER &
FORREST J. MORK
*Eyre, Mann & Lucas*
their ATTORNEYS 3,411,950
COLD WATER SWELLING CARBOHYDRATES
Kurt I. L. Aspman and Clifford H. Hullinger, Chicago, and Forrest J. Mork, Calumet City, Ill., assignors to American Maize-Products Company, a corporation of Maine
Continuation-in-part of application Ser. No. 94,933, Mar. 10, 1961. This application Dec. 2, 1966, Ser. No. 621,078
6 Claims. (Cl. 127—71)

This application is a continuation-in-part of copending application Ser. No. 94,933, filed Mar. 10, 1961, now abandoned.

This invention relates to a process for improving the dispersibility of cold water swelling carbohydrate materials in water and to the improved carbohydrate products formed by the process.

It is known that certain carbohydrate materials such as common starch and flour are insoluble in water at ambient temperatures. In order to dissolve or disperse such materials in water, it is necessary to apply heat and raise the temperature above the starch gelatinization point whereby the starch granules are caused to swell, burst and disintegrate to form aqueous sols. Pregelatinized starch is a solid material which has been converted from the insoluble natural form by means of the gelatinization process described above and then dried to eliminate water and recover water soluble or water dispersible particles. Since the pregelatinized starch particles have been converted to a water soluble form which unlike natural starch can be dissolved or dispersed in water without use of heat, they are sometimes referred to as a cold water swelling material. The advantage to the user of a cold water swelling starch is that he need not carry out a gelatinization treatment, this having been already done by the manufacturer, and the starch may be incorporated in aqueous systems without having to apply the heat of gelatinization which always represents the economic debt of an additional processing step and, in some cases, may be intolerable in the system.

While cold water swelling carbohydrate materials such as pregelatinized starch are referred to as being water soluble, it is actually very difficult to disperse particles of these materials in water in a uniform manner. The particles that first make contact with the water swell almost instantly and form a mucilaginous surface layer which encloses unwetted carbohydrate material within and this results in the formation of lumps of varying size. These lumps can be dispersed by means of high speed agitation but this is time consuming and expensive and the shearing forces involved tend to reduce the thickening power of the carbohydrate material. The problem of formation of lumps is particularly acute with pregelatinized starches which have very high water holding power as compared to other cold water swelling carbohydrate materials. Examples of such other materials are vegetable gums, carboxymethylcellulose (CMC) and dextrins all of which also suffer to varying degrees from the dispersal problem noted above. As used in the specification and claims herein, the term "cold water swelling carbohydrate material" is defined to mean all of these materials, namely, pregelatinized starch, vegetable gums, carboxymethylcellulose, and dextrins. The term does not include common ungelatinized starch or flour neither of which pose the problem of dispersal in ambient temperature water with which the present invention is concerned.

We have now found that if particles of the cold water swelling carbohydrate material are caused to aggregate around a single droplet of water there is formed a porous bead-like structure which is larger in size than the original particles and the bead can be readily dispersed in water in uniform manner without substantial formation of lumps or like variations in the overall dispersion.

In order to achieve the relatively large porous beads of our invention, we spray droplets of water into a bed of starch in which the particles in at least the surface layer are kept in motion so that when a droplet of water strikes the surface the relatively large porous bead that is formed is immediately turned in or rolled over and covered with fresh dry powder. In this way successive droplets of water strike fresh dry powder and there is little tendency for the porous beads to coalesce and form doughy lumps. Agitation of the starch bed to provide the required movement of surface particles cannot be achieved with ordinary agitators customarily employed in the starch industry. The ordinary agitators such as ribbon blenders or agitating screws have elements which are exposed on the surface of the agitated starch bed and once the equipment is wet, doughy lumps of starch begin to form.

In our work we have found it essential to maintain continuous motion of the particles on the surface of the bed of starch and to control the water spray to avoid contact between the water droplets and the agitating equipment. We have successfully achieved these conditions in a tumbling barrel. The tumbling action at the surface of the bed of starch causes the particles to continuously roll and tumble as the bed is rotated so that as a droplet of water strikes the surface of the bed it immediately forms a porous bead which is turned in or rolled over and tumbled and thereby covered with fresh dry starch which prevents coalescence and formation of doughy lumps. Control of the water spray to prevent wetting of the exposed surface of the equipment is readily carried out by confining the spray of droplets to the relatively large surface of the bed of starch in the tumbling barrel.

It is to be noted that in our process, water is the agent used to form the porous, easily-dispersible beads of the invention. Water, of course, is a solvent for the carbohydrate particles being treated and it is a distinct feature and advantage of the invention that only the solvent is necessary without having to introduce extraneous ingredients into the beads such as adhesives or binders. Use of adhesives or binders is of disadvantage since a pure cold water swelling carbohydrate product is impossible to attain and the cost of the adhesive increases the cost of the final product. It is possible in our process, if desired, to include in the water dissolved solids of the same or different cold water swelling carbohydrate material that is being converted into porous beads. This is of advantage in helping a solid core of carbohydrate material to form within each bead but it is of disadvantage in decreasing the solubilizing capability of the water droplets placed upon the carbohydrate bed. However, this option may be considered desirable in specific cases and when used retains the primary advantage of not introducing separate, extraneous adhesives or binders.

Further details of the process and apparatus of this invention can be readily understood by reference to the accompanying drawings in which:

FIG. 1 is a side view of the tumbling barrel in axial section;

FIG. 2 is a cross sectional view taken on line 2—2 of FIG. 1;

FIG. 3 is similar to FIG. 1 showing a modification of the barrel for use in a continuous process.

A preferred form of apparatus is shown in FIG. 1. As there shown a steel tumble-barrel 10 having one closed end 12 is rotatively mounted by conventional means well known in the art. The barrel is approximately 35 inches long and has a diameter of about 22 inches. Since the mounting means and means for rotating the barrel are conventional and not part of the present invention we do not deem it necessary to describe the details thereof.

In the preferred form of apparatus shown the axis of the barrel is preferably inclined about 18° away from a horizontal position. Optimum results are achieved at this angle but, of course, other angles may be employed and even a horizontal position may be used. The closed end of the barrel is connected to driving means as by shaft 14 for rotating the barrel in conventional manner. In the preferred form of structure shown longitudinal flanges 18 are positioned along the inside wall of the barrel in regular spaced relationship. These flanges assist in providing the desired tumbling action in that they tend to prevent the carbohydrate particles from sliding on the inside wall of the barrel. The flanges are not necessary as tumbling may be readily achieved by control of the speed of the barrel for the particular material at hand. A pipe 20 for supplying water or other liquid is connected to spray head 22 which is positioned near the closed end of the barrel. As mentioned hereinabove it is important that the water droplets strike the bed of starch 24 and care should be taken to insure that none of the water will contact the inside wall of the barrel. Spray head 22 is conventionally made to provide a spray of droplets of water. The droplets are of such size and weight that they fall freely down upon the surface of the carbohydrate material charged to the barrel. A fine mist or fog which remains suspended in air for a relatively long period of time is not operable because this would only result in wetting the inside wall of the barrel.

The speed of rotation of the barrel is important and should be controlled to give the desired tumbling action. If the rotation is too rapid the powdered carbohydrate material may be carried around by the barrel wall by centrifugal force. If the speed of rotation is too low the carbohydrate particles will not tumble sufficiently to achieve the desired results. We have found that for a barrel of the dimensions specified hereinabove a speed of rotation of about 48 r.p.m. gives best results for pregelatinized starch having particles of a size specified hereinbelow. However, the speed of rotation for the above specified barrel can vary from about 5 r.p.m. to about 80 r.p.m. and best results are achieved between about 12 to 70 r.p.m. For larger or smaller barrels equivalent speeds of rotation should be employed so as to give the required tumbling action in at least the surface layer of the carbohydrate material being treated.

In the preferred structure shown in FIG. 1 the front open end of the barrel is partially enclosed with an annular lip 16 in order to increase its capacity for holding the carbohydrate charge. However, it is not essential that the annular lip be employed as the capacity of the barrel can also be increased by positioning the axis of the barrel at larger degrees of inclination away from a horizontal position.

The amount of carbohydrate material charged to the barrel should be at least enough to form a continuous bed in the area of the water spray. It is preferred, of course, that more of the carbohydrate material than this minimum amount be added to the barrel as a single charge in order to increase the throughput per unit holding time. For best results with the barrel of the above specified dimensions the amount of carbohydrate should be about ⅓ of the total volume of the barrel. Greater amounts of initial charge than ⅓ the total barrel volume may be employed but this gives no added special advantage and is not actually necessary.

The amount of water added to any one charge of carbohydrate material will generally be a maximum of about 10% based on the weight of the charge. Commercially available cold water swelling carbohydrate materials usually have inherent water contents of at least 1 to 4% and we have found that the maximum amount of water in the porous bead product should not exceed about 14% based on the weight of the charge. If the water content is higher than this, the product will cake and the cake does not provide the easily-dispersible quality achieved by the porous beads of the invention.

By taking up water in our process the carbohydrate product decreases in density usually from about 10 to 60% and depending on the particular carbohydrate material and the extent of aggregation the change in density may be outside the stated limits. But in all cases the density of the final porous beads will be less than that of the starting feed material.

As stated hereinabove the porous beads formed in the process have a relatively large particle size in comparison to the particle size of the charge. The particle size of the original carbohydrate material may be such that from 10 to 100% of the particles pass through a 200 mesh Tyler screen. Usually, in the commercially available products from 40 to 70% of the carbohydrate particles will pass through the 200 mesh screen so that the major portion of the particles have average diameters of about 0.0029 inch. After the carbohydrate material has been aggregated in accordance with this invention the overall particle size of the porous beads preferably is such that up to about 90% of the beads will be retained on a 100 mesh Tyler screen so that the beads, for the major part, have average diameters of 0.0058 inch and greater. Valuable results are achieved if the original carbohydrate particles are aggregated to the extent that about 70% of the porous beads will be retained on the 100 mesh screen but as it is preferred that at least about 90% of the porous beads be retained on 100 mesh screen, the better procedure is to recycle the fines to reach the higher degree of aggregation. If the material is aggregated to about 70% to 90% retained on 100 mesh screen it is not actually necessary to separate the fines as the ratio of the coarse particles to the fines in the composite material is so substantially increased that the material forms a uniform dispersion in water practically as well as one from which the fines have been recycled or separated out. Thus, this high degree of aggregation gives the optimum dispersibility in the final product. However, while the particle size of the feed material will be increased in all cases to come extent, it is important that not more than about 10% of the original particles be aggregated to porous beads large enough to be retained on a 20 mesh screen or, in other words, to reach average diameters of more than 0.0328 inch.

From the foregoing it will be obvious that the product formed in our process is relatively large in size as compared to the original charge material and yet the product is small enough in size so that preferably at least 90% of it will pass through a 20 mesh screen. By confining the size of the product within these limits, we have found that the structure of the porous beads is remarkably stable so that the beads may be packed and shipped with normal procedures. In fact, the structure is remarkably tenacious and this apparently stems from the fact that the water droplets forming the core of the beads are small enough to be more or less absorbed by the inner particles of carbohydrate material so that the water is no longer in an actual fluid state and pressure on the particles forming the outer portion of the beads cannot normally cause collapse or other deterioration of the structure. Another important fact contributing to the strength of the bead structure is, of course, the fact that the carbohydrate material is water soluble whereby the water droplet core of the beads is strongly adhered to and more or less absorbed by the water soluble carbohydrate material.

FIG. 3 shows a modified form of apparatus which may be used to effectively aggregate particles of the cold water swelling carbohydrate in a continuous process. In this modification a hopper 26 is positioned outside the front end of the barrel and a screw conveyor 28 is connected to the hopper for conveying the carbohydrate particles back into the closed end of the barrel. Since the porous beads work their way forward to the front open end of the barrel during rotation, the product will continuously overflow the concentric lip 16 and be discharged from the apparatus as fresh particles of feed carbohydrate material are continuously fed into the back of the barrel. By controlling the rate of feed of the original particles in correlation to the speed of rotation of the barrel, the ratio of the porous beads being formed in the barrel to the amount of feed particles can be maintained at a point where there is maximum production of beads per unit time.

In the foregoing description of our invention we have described various materials that may be used and their equivalents, and ranges, limits and conditions within which our invention may be practiced. In the following examples we set forth the best mode contemplated by us of carrying out our invention but it is to be understood that these examples are not to be taken as limiting the invention.

EXAMPLE 1

600 grams of hot rolled dextrin was placed in an apparatus similar to that of FIG. 1. The apparatus was rotated at a speed of approximately 48 r.p.m. and a total of 10 ml. of water was sprayed in as the carbohydrate particles were continuously tumbling. This procedure was repeated as a control with a second batch of the dextrin except that water was not sprayed in. The control and treated samples were analyzed by Tyler sieve screens with the following results:

| | Percent by weight retained on— | | | Percent by weight passing through 100 mesh |
|---|---|---|---|---|
| | 20 mesh | 40 mesh | 100 mesh | |
| Control | | | 72 | 28 |
| Treated | 5 | 31 | 40 | 24 |

The results show that 36% of the original charge was converted to porous beads having average diameters of at least about 0.145 inch whereas the original charge had no particles of such diameter. About 76% of the original particles in the form of the porous beads were retained on a 100 mesh screen.

EXAMPLE 2

Example 1 was repeated except that 400 grams of the carboyhydrate particles were treated and 10 ml. of a solution comprising one part 42 dextrose equivalent (D.E.) corn syrup and three parts water was used in place of water alone. Screen analysis results were:

| | Percent by weight retained on— | | | Percent by weight passing through 100 mesh |
|---|---|---|---|---|
| | 20 mesh | 40 mesh | 100 mesh | |
| Control | | | 72 | 28 |
| Treated | 1 | 6 | 80 | 13 |

In this example 97% of the carbohydrate particles were converted into porous beads which were retained on a 100 mesh screen while only 1% of the particles were converted into beads large enough to be retained on a 20 mesh screen.

EXAMPLE 3

Example 2 was repeated except 30 ml. of a 50-50% blend of 15 D.E. corn syrup solids and water was employed in place of the 10 ml. of solution used in Example 2. Screen analysis results were:

| | Percent by weight retained on— | | | Percent by weight passing through 100 mesh |
|---|---|---|---|---|
| | 20 mesh | 40 mesh | 100 mesh | |
| Control | | | 72 | 28 |
| Treated | 2 | 43 | 53 | 2 |

As shown by the screen analysis about 98% of the particles were aggregated into porous beads large enough to be retained on a 100 mesh screen while only 2% of the original particles in the form of beads were retained on a 20 mesh screen.

EXAMPLE 4

Example 2 was repeated except that 30 ml. of a 20% aqueous dextrin solution was employed in place of the 10 ml. of solution used in Example 2. Screen analysis results were:

| | Percent by weight retained on— | | | Percent by weight passing through 100 mesh |
|---|---|---|---|---|
| | 20 mesh | 40 mesh | 100 mesh | |
| Control | | | 72 | 28 |
| Treated | 1 | 15 | 80 | 4 |

Here about 96% of the original particles were retained on a 100 mesh screen in the form of porous beads while only 1% of the original particles were converted into beads large enough to be retained on a 20 mesh screen.

EXAMPLE 5

2000 grams of cold water swelling corn starch was charged to an apparatus similar to that of FIG. 1. The apparatus was rotated at a speed at which the starch particles were continuously tumbling and during such movement a total of 200 ml. of a 50% solution of 15 D.E. corn syrup solids in water was sprayed in. A control sample was also run and screen analysis gave the following results.

| | Percent by weight retained on— | | | Percent by weight passing through 100 mesh |
|---|---|---|---|---|
| | 20 mesh | 40 mesh | 100 mesh | |
| Control | | | 70 | 30 |
| Treated | 1 | 35 | 56 | 6 |

As shown in this example about 94% of the original particles in the form of beads were retained on a 100 mesh screen while only 1% of the particles were converted into beads large enough to be retained on a 20 mesh screen.

All of the relatively large porous beads prepared in the foregoing examples dispersed readily in water in uniform manner without the formation of lumps or other objectionable variations.

We have carefully examined the product formed in our process under a microscope and find that the product appears to be aggregates or clumps of material with an opaque center but with a very irregular honey-combed surface. Particles of the feed carbohydrate material on the other hand resemble bits of broken glass in which the shape may be irregular but the sides of the particles appear to be quite straight and uniform. Apparently in our process the particles are caused to aggregate around the water droplet in random manner so that the arrangement of particles around the droplet is an irregular three dimensional cage like structure in the general form of a bead. Furthermore, the water droplet core of the bead is no longer in a fluid state since the inner carbohydrate particles swell and more or less absorb the water. However, the controlled maximum particle size of the beads prevents a relatively wet mucilaginous layer from forming around the outer portion of the bead and thereby preventing the dry carbohydrate particles within from contacting and absorbing water. Because of these features the structure we achieve ensures that the maximum surface area of all of the dry particles makes a uniform initial contact with water whereby a dispersion is immediately formed in entirely uniform manner.

It will be understood that it is intended to cover all changes and modifications of the preferred embodiment

What is claimed is:

1. The method of forming porous, water-dispersible beads of a cold water swelling carbohydrate material which comprises the steps of forming a bed of finely-divided particles of said carbohydrate material, causing the carbohydrate particles in the surface layer of the bed to roll and tumble continuously across the surface of the bed and causing fresh carbohydrate particles from sub-surface layers of the bed to surface and roll and tumble continuously over the first said rolling and tumbling particles to cover the same, simultaneously causing a plurality of discrete water droplets to strike the surface of the bed in the absence of any extraneous adhesive for the particles thereof whereby said rolling and tumbling particles aggregate around each droplet of water in the form of discrete porous beads, continuously moving said porous beads out of the zone where the droplets strike the surface of the bed, limiting the amount of water added as aforesaid to a quantity up to about 14% based on the weight of said carbohydrate particles, and continuing the aggregation of said carbohydrate particles until at least about 70% by weight of the resulting porous beads are of a size that is retained upon a 100 mesh Tyler screen.

2. The method in accordance with claim 1 wherein the amount of water is limited to a quantity up to about 10% based on the weight of said carbohydrate particles.

3. The method in accordance with claim 1 wherein the aggregation of said carbohydrate particles is continued until about 90% by weight of the resulting porous beads are of a size that is retained upon a 100 mesh Tyler screen.

4. The method in accordance with claim 1 wherein said cold water swelling carbohydrate material is a pregelatinized starch.

5. The method in accordance with claim 1 wherein said cold water swelling carbohydrate material is a dextrin.

6. Porous, water-dispersible beads of a cold water swelling carbohydrate material produced by the method of claim 1.

References Cited

UNITED STATES PATENTS

| 1,035,830 | 8/1912 | Anderson | 127—32 |
| 1,155,977 | 10/1915 | Vernon | 99—93 |
| 1,239,221 | 9/1917 | Rodman. | |
| 1,908,979 | 5/1933 | Herbst | 264—117 X |
| 1,928,894 | 10/1933 | Jefferies | 127—71 |
| 2,772,178 | 11/1956 | Kunze et al. | 106—208 |
| 2,856,290 | 10/1958 | Peebles. | |
| 2,954,306 | 9/1960 | Bond et al. | 127—32 X |
| 2,970,063 | 1/1961 | Jordan et al. | 106—208 |
| 2,995,773 | 8/1961 | Gidlow et al. | |
| 3,139,465 | 6/1964 | Klopf | 264—117 X |
| 3,221,338 | 11/1965 | Segal | 99—93 |

OTHER REFERENCES

Radley, J. A.: Starch and its Derivatives, 3rd edition, vol. I, 1954, John Wiley, New York, pp. 81–83 relied on (copy in GP. 170).

MORRIS O. WOLK, *Primary Examiner.*

SIDNEY MARANTZ, *Assistant Examiner.*